United States Patent
Bourgraf et al.

[15] 3,684,307
[45] Aug. 15, 1972

[54] OFFICE MACHINE CART

[72] Inventors: Elroy E. Bourgraf, Cincinnati; Kenneth R. Self, Washington, both of Ohio

[73] Assignee: Ferno-Washington, Inc., Greenfield, Ohio

[22] Filed: March 29, 1971

[21] Appl. No.: 128,877

[52] U.S. Cl. ............ 280/36 C, 280/12 R, 280/47.24, 280/47.33
[51] Int. Cl. .............................................. B62b 11/00
[58] Field of Search ...280/36 C, 47.19, 47.24, 47.33, 280/12 R, 30

[56] References Cited

UNITED STATES PATENTS

| 180,868 | 8/1957 | Diehl | 280/47.19 |
| 2,835,503 | 5/1958 | Humphries | 280/47.19 |
| 2,579,639 | 12/1951 | Adams | 280/47.19 |
| 2,784,004 | 3/1957 | Hamrick | 280/47.19 |
| 3,137,511 | 6/1964 | Weil | 280/30 |

FOREIGN PATENTS OR APPLICATIONS

| 869,564 | 10/1940 | France | 280/36 C |

*Primary Examiner*—Benjamin Hersh
*Assistant Examiner*—Robert R. Song
*Attorney*—Melville, Strasser, Foster & Hoffman

[57] ABSTRACT

A cart having a collapsed and an erect condition, and adapted for transporting and demonstrating office machines. The cart includes a machine supporting surface or table element on which a machine may rest for demonstration, and to which it may be secured for transportation. In the collapsed condition, the table member is folded down with the machine secured thereto. An adjustable tongue or draw bar is provided by means of which the user may pull or push the cart. In the erect condition the table member is raised to the horizontal at a normal working height for a seated operator, and may be locked in this condition. The cart, in its erect condition, rests on a pair of wheels and a pair of minor leg members. The frame of the cart, on the side from which it is pushed or pulled when in collapsed condition, is provided with plastic runners disposed substantially tangentially to the wheels and terminating in curves at their lower ends in substantial alignment with the axis of said wheels, to act as skids in pulling said cart up or pushing it down steps.

8 Claims, 10 Drawing Figures

INVENTOR/S
ELROY E. BOURGRAF
KENNETH R. SELF

BY *Melville, Strasser, Foster and Hoffman*
ATTORNEYS

INVENTOR/S
ELROY E. BOURGRAF
KENNETH R. SELF

BY *Melville, Strasser, Foster and Hoffman*
ATTORNEYS

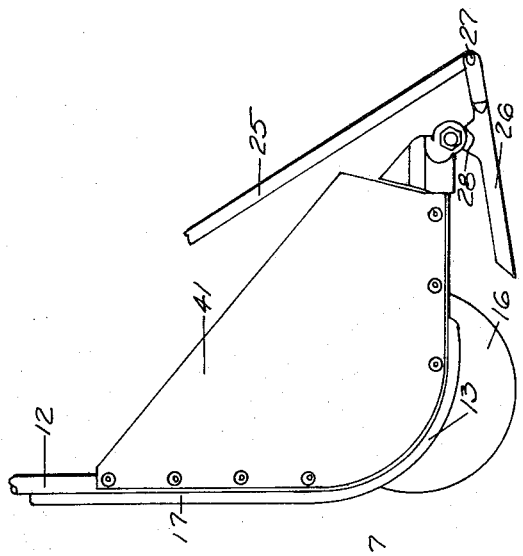
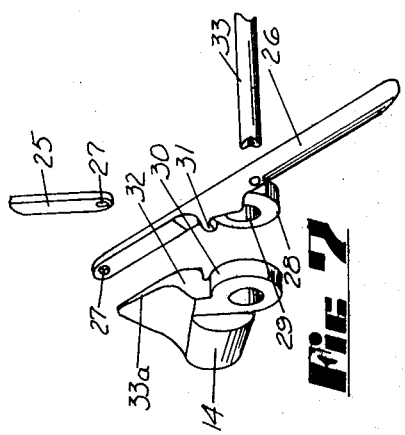
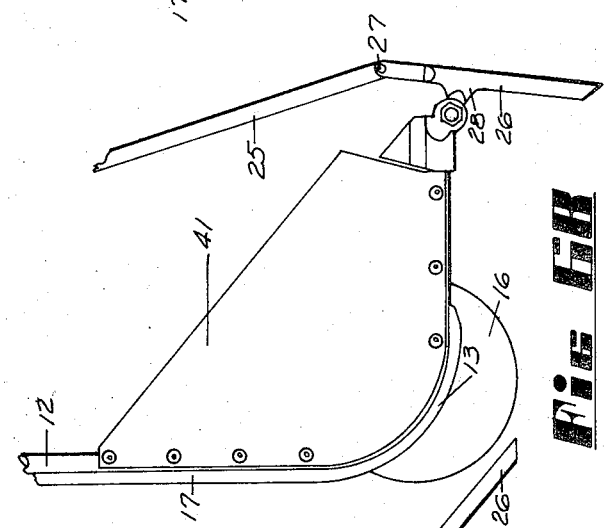
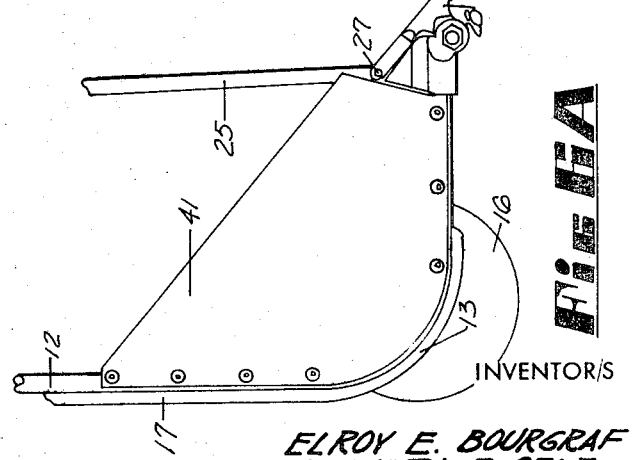

OFFICE MACHINE CART

BRIEF SUMMARY OF THE INVENTION

Salesmen for business machines such as typewriters, adding machines, bookkeeping machines, calculators, small computers, radios, television sets, audio-visual equipment and the like, must generally carry with them the machine they are to demonstrate and sell. These machines are usually of substantial bulk and weight, and therefore difficult and even dangerous to carry. Because of their weight they impose a tremendous physical strain on the salesmen, and if they are dropped, the damage can be very substantial.

The present invention provides a solution to the above noted difficulties, in that the cart, in its collapsed condition, is easily handled. It has a table member to which the machine to be demonstrated may be secured, and the cart may be pulled or pushed by the salesman. By a simple maneuver, the table member may be raised to a horizontal position at normal height for a seated operator, and locked against collapse. It is provided with a tongue or draw bar, which is adjustable in length to suit the particular salesman; and by means of this tongue the cart and its cargoe can be pulled or pushed over long distances without fatigue to the salesman. It can be easily pulled up, or pushed down steps in going from place to place; and for a demonstration, the machine need not be removed from the table member, since this is at a normal height for a seated operator.

Basically, the cart comprises a generally rectangular main frame having vertical side members curved rearwardly at the bottom to provide supports for a shaft on which the two wheels are mounted. The vertical side members are provided with runners of nylon, or similar material having a low coefficient of friction and adapted to serve as skids in pulling a loaded cart up a step or pushing it down a step. Centrally of this main frame an adjustable telescoping tongue or draw bar is provided, by means of which the salesman may pull or push the cart.

A table member is hingedly secured to said main frame near the top. An articulated leg member is pivotally secured to each side of the table member. Each of the articulated leg members comprises a major upper leg member and, pivotally joined thereto, a lower minor leg member. The lower members have stub arms pivotally secured to the ends of the rearwardly curved portions of the vertical side members of the main frame. Thus, the pivotal connections between the major and minor leg members may be thought of as "knees"; and the rearwardly curved portions of the vertical side members of the main frame provide blocks against which said leg members may "kneel" when the cart is in its erect condition. By virtue of the stub arms, a toggle action is achieved, and the major and minor leg portions go past dead center in reaching the "kneeling" position. Means are provided to lock the cart in this position against accidental collapse; and in this condition the cart is supported on its two wheels and on the knees of the leg members.

BRIEF DESCRIPTION OF THE SEVERAL VIEWS OF THE DRAWINGS

FIGS. 6a 6b, and 6c are fragmentary views similar to FIGS. 3a and 3b but seen from the opposite side of the cart, showing stages in the configuration in shifting from erect to collapsed condition.

FIG. 7 is a perspective exploded view of the "knee" connection.

DETAILED DESCRIPTION

Figure 1:
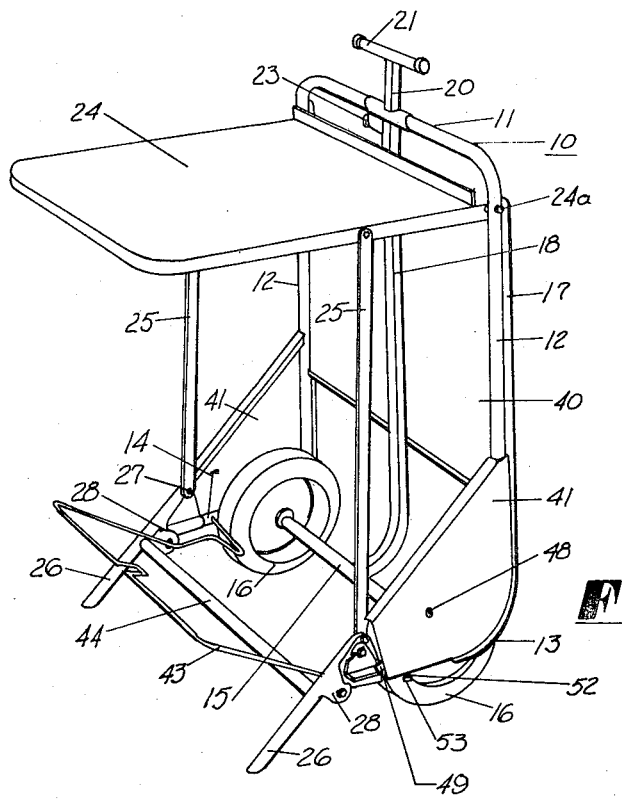
FIG. 1 is a perspective view of the cart in its erect condition.
Figure 2:
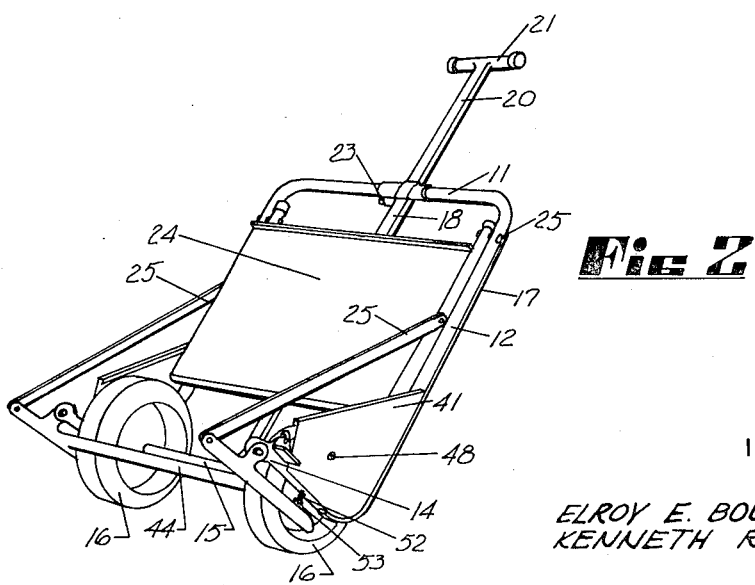
FIG. 2 is a similar view of the cart in its collapsed condition and tilted for pulling or pushing.
Figure 3A:
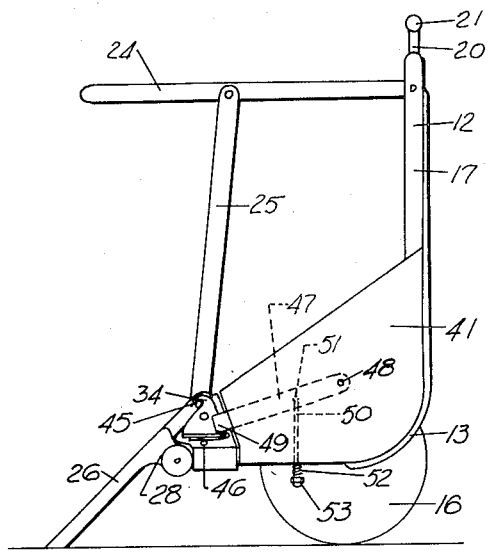
FIG. 3a is a side elevational view of FIG. 1 as seen from the right side thereof.
Figure 3B:
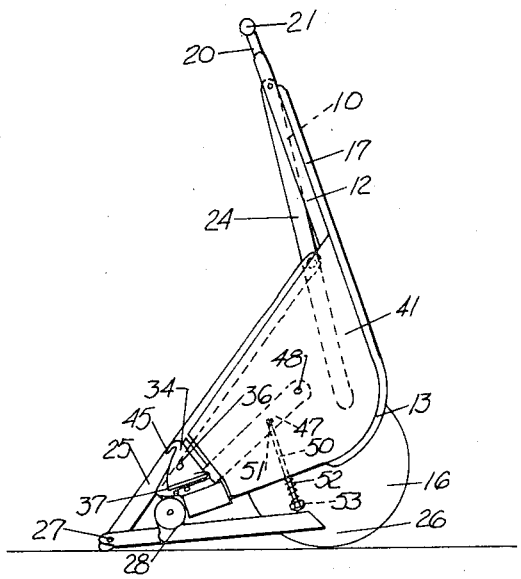
FIG. 3b is a view similar to FIG. 3a showing the cart in its collapsed condition, but standing up as for storage.

The art of the present invention is shown in FIG. 1 in its erect condition ready for a demonstration of whatever business machine rests upon the table. The cart is shown in FIG. 2 in collapsed condition and tilted for pulling by a salesman or pushing from one place to another. FIG. 3a is simply an elevational view of FIG. 1 and FIG. 3b shows the cart configuration of FIG. 2 but standing up as for storage. It will be understood of course that the cart may be tilted and pulled or pushed by the operator without collapsing it if it is only desired to move the cart a relatively short distance. In the description which follows the right side of the cart as seen in FIGS. 3a and 3b or the side away from the viewer, as seen in FIGS. 1 and 2, will be referred to as the front, and the side toward the viewer in FIGS. 1 and 2 and to the left in FIGS. 3a and 3b will be referred to as the rear.

Figure 4:
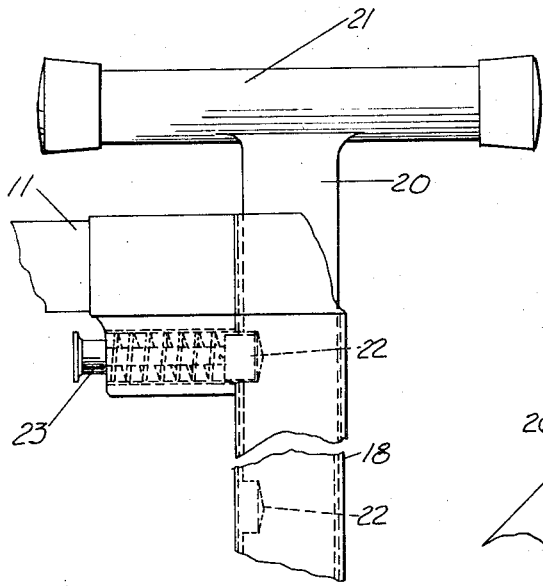
FIG. 4 is a detailed view on an enlarged scale, with parts in section, showing the adjustment means for the tongue.

Referring now to FIG. 1, the cart consists basically of a frame member which is in the configuration of an inverted U and is indicated generally at 10. There is thus provided an upper cross member 11 and the two vertical side frame members 12. The side frame members 12 curve rearwardly at the bottom as indicated at 13 and terminate in a horizontal portion 14 (FIG. 2). An axle 15 extends across between the members 14 adjacent the termini of the curves 13 and the wheels 16 are mounted on this axle. The front of the vertical members 12 is faced with plastic runners 17 which extend around the curve 13. These runners may be of nylon or other suitable plastic having a low coefficient of friction. They are of great assistance in pulling the cart up a step or pushing it down a step when it is in its tilted condition. A center vertical frame member is provided at 18 and it also curves at the bottom as at 19 and is secured to the axle 15. The member 18 is hollow and a tongue or draw bar 20 having a handle member 21 is telescopingly engaged therein. As best seen in FIG. 4, the member 20 is provided with a plurality of openings or recesses 22 and a spring actuated plunger 23 is secured to the member 11 and passes through an aperture in the member 18 so as to engage in a selected one of the recesses or apertures 22. In this way the extension of the handle 21 may be adjusted to suit the height of the salesman who is using the cart.

Figure 5:
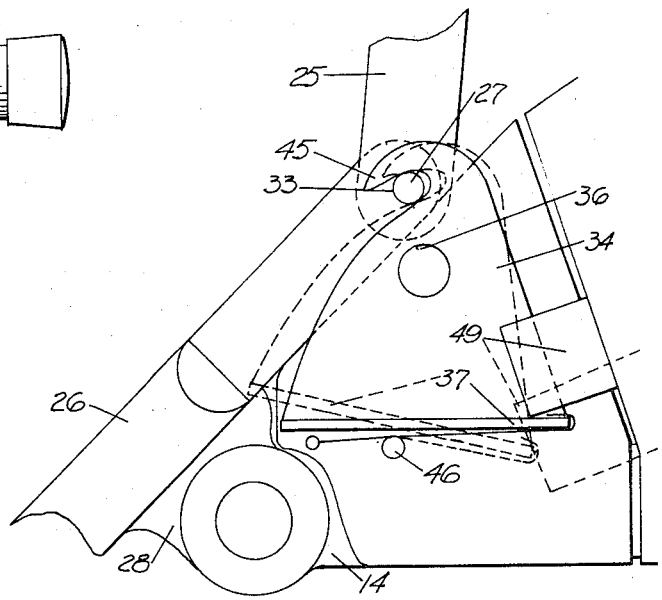
FIG. 5 is a fragmentary view of the "knee" structure and the locking device.

A table member 24 is pivotally secured to the frame members 12 near their upper ends as indicated at 24a. Pivotally secured to each side of the table member 24 is an articulated leg member comprising a major upper portion 25 and a minor lower portion 26. The point of articulation of the members 25 and 26 is indicated at 27. Each of the members 26 has a stub arm 28 which is pivotally secured to the horizontal extension 14 of the members 17. By reference to FIG. 7, which is an exploded view of the "knee" portion of the legs, it will be clear that the rearwardly extending end of the member 14 and the stub arm 28 on the leg member 26 have cooperating mutually facing bearing elements 29 and 30. Associated with the member 29 is an abutment 31 and similarly associated with the member 30 is an abutment 32. When these members are connected by means of the pin 33 with the faces 29 and 30 in engagement with each other, the abutments 31 and 32 provide limiting stops for the pivotal movement of the leg member 26. Additionally, the portion 14 is provided with the sloping abutment surface 33a against which the leg member 26 "kneels" when the device is in its erect condition. It will be understood that the structure just described is duplicated on the other side of the cart. In FIG. 5 a locking device is shown which comprises a locking hook element 34 having a slot 35 which engages the pin 33 and which is pivoted at 36. It is provided with a flange 37 so that it may be foot-actuated and tilted between the solid and broken line positions. In the solid line position the "knee" is locked in the "kneeling" position and when the member 34 is tilted to the broken line position, the cart may be collapsed.

A refinement of the locking arrangement may be provided as shown in FIGS. 3a, 3b and 5. It will be noted that the upper surface of the hook member 34 is formed as a cam surface as indicated at 45, and a torsion spring 46 is provided to urge the hook member 34 in a counterclockwise direction (toward locking position). With this arrangement it will be clear that in putting the cart into erect condition, the pin 33 will cam the member 34 in a clockwise direction until the slot 35 comes into alignment with the pin, whereupon the spring 46 will cause the member 34 to snap counterclockwise into locking engagement with the pin 33.

In order to hold the member 34 in fully unlocked condition, there is provided a retent bar 47, (FIGS. 3a and 3b) pivoted at 48 to the strengthening gusset 41. The retent 47 is of such length in relation to its pivot point that its free end 49 rests on the flange 37 when the hook member 34 is in its locked position (FIG. 3a). When the member 34 is pivoted to fully unlocked position, the retent bar 47 drops to the broken line position (FIG. 5) to hold the member 34 in unlocked condition (FIG. 3b).

To free the member 34, an actuator 50 is pivotally attached to the retent bar 47 as at 51, and extends through an aperture in the member 14. Below the member 14 a coil spring 52, held in place by a cap nut 53, exerts a downward pull on the actuator 50, and thus a counterclockwise pull on the retent bar 47, urging it to the broken line position. The retent bar may be released to permit locking action of the member 34 by pushing upward on the actuator 50 against the effort of the spring 52. It will be observed that such an action is automatically accomplished by the lower leg portion 26 when the cart is placed in collapsed condition.

The geometry of the structure is such that in the erect condition with the frame members 12 in the vertical position, the major portions of the legs 25 are substantially vertical although actually they tilt forwardly somewhat at their upper ends. The minor portions 26 of the legs slope rearwardly and downwardly to engage the floor and the structure rests on the ends of the two minor portions of the legs 26 and on the wheels 16. In this position, the table member 24 is disposed at a normal height for a seated operator.

Thus, for a demonstration the cart may be pulled to a suitable place and set up in the configuration of FIGS. 1 and 3a and an operator may sit down in a chair at the rear of the cart and operate the machine which is resting on the table member 24. The cart, of course, may be provided with a panel 40 providing a modesty shield and the strengthening gussets 41 also constitute modesty shields.

If it is desired to move the cart or the machine on the cart to another location not too far away, the handle 21 may be extended and the cart tilted and the assembly may be pulled to another location. If, however, it is desired to transport the machine to a remote location, as for example to another building, then it is desirable to collapse the cart to the configuration shown in FIGS. 2 and 3b. To accomplish this, the lock member 34 is actuated to unlock the structure whereupon the configuration of the legs goes through the positions shown in FIGS. 6a to 6c inclusive and the cart is in its fully collapsed condition in FIG. 6c. As best seen in FIG. 3b, in this condition the knee portions 27 of the legs rest on the floor and the table member 24 is folded forwardly against the rear of the frame 10. Thus, the cart may be left standing in the position of FIG. 3b or it may then be tilted as shown in FIG. 2 and the tongue 20 extended to a convenient length for pulling or pushing the cart along. It will be understood that when the cart is to be collapsed with a business machine resting on the table member 24, means will be provided to secure the business machine to the table member, as for example by means of straps. If the business machine is strapped to the table 24 for travel, the entire unit may be transported back and forth in the collapsed condition and in this condition it may be stowed in the trunk of an automobile or in the back of a station wagon with no difficulty.

As an additional convenience, a wire rack 43 may be provided which is pivoted in the members 14 and which may be folded out to the position shown in FIG. 1 resting against a cross brace 44 extending between the minor leg portions 26. The rack 43 may be used as a support for a brief case, tool kit, or the like. When not in use, the rack is simply folded in to the position shown in FIG. 2.

It will be understood that numerous modifications may be made in detail without departing from the basic principles of the invention. Therefore, no limitation not expressly set forth in the claims is intended or should be implied.

The embodiments of the invention in which an exclusive property or privilege is claimed are defined as follows:

1. A business machine transporting and demonstrating cart, comprising a main frame having vertical side elements curving rearwardly into horizontal portions at their lower ends, an axle connecting said horizontal portions adjacent the termini of said curves, a pair of wheels rotatively mounted on said axle, a tongue secured to said main frame, a table member pivoted to said main frame near the top thereof, a pair of articulated legs pivotally connected to said table member in spaced relation to said main frame, each of said legs consisting of a major upper portion and a minor lower portion, a forwardly extending stub arm on each of said minor leg portions and pivotally secured to the respective ends of the horizontal portions of said main frame, said horizontal portions having abutment blocks adapted to be abutted by the portions of said minor leg portions above said stub arms in the erect condition of said cart, the geometry of the parts being such that in the erect condition, the major leg portions are in a substantially vertical position, the pivotal connections between said stub arms and the horizontal portions of the main frame are disposed rearwardly of the points of articulation of said leg members, and said lower leg portions extend downwardly and rearwardly beneath the table member, and in the collapsed condition said table member is in a substantially vertical position, said minor leg portions occupy a forwardly extending substantially horizontal position, and the lower ends of the major leg portions slope rearwardly with their lower ends resting on the ground and the main frame sloping slightly to the rear.

2. The structure of claim 1, wherein said main frame includes a vertical central element curving rearwardly into a horizontal portion at its lower end, said lower end being secured to said axle, and said vertical element having a tongue telescopingly engaged therein, and means to lock said tongue selectively in a number of positions of extension.

3. The structure of claim 1, wherein the articulated connection between one of the major and minor leg portions has an extending pin, and a hook member is pivotally mounted on the respective abutment block, said hook member being adapted to be pivoted to engage over said pin to lock said cart in erect condition.

4. The structure of claim 3, wherein said hook member is provided with a foot-actuable flange for locking and unlocking said cart in erect condition.

5. The structure of claim 3, wherein a spring is provided to urge said hook member to locking position, and said hook member incorporates a cam surface engageable by said pin, whereby said hook member is cammed toward unlocking position by said pin, and after passage of said pin past said cam surface said hook member snaps into locking position under the influence of said spring.

6. The structure of claim 5, wherein a retent bar is provided to engage said flange to hold said hook member in fully unlocked condition, said retent bar having an actuating member, and a spring urging said actuating member and retent member to flange engaging position, whereby pressure on said actuating member releases said hook member to locking position.

7. The structure of claim 6, wherein said actuating member is positioned to be abutted by a lower leg portion to operate it, when said cart is placed in the collapsed condition.

8. The structure of claim 1, wherein a generally U-shaped wire rack is pivotally mounted between the horizontal portions of the main frame, and a brace member is provided connecting the said minor leg portions, said rack resting on said brace member when pivoted outwardly for use.

* * * * *